United States Patent [19]

Lee

[11] Patent Number: 5,533,098
[45] Date of Patent: Jul. 2, 1996

[54] WIDE-AREA-NETWORK TRUNKED RADIO SYSTEM WHICH CONTROLS THE SIGNAL LEVEL OF A SPECIFIC WIRELESS VOICE CHANNEL OF A LOCAL AREA NETWORK TRUNKED RADIO SYSTEM

[75] Inventor: Won-cheon Lee, Seoul, Rep. of Korea

[73] Assignee: Goldstar Information & Communications, Ltd., Seoul, Rep. of Korea

[21] Appl. No.: 301,793

[22] Filed: Sep. 7, 1994

[30] Foreign Application Priority Data

Sep. 15, 1993 [KR] Rep. of Korea .................. 1993-18580

[51] Int. Cl.$^6$ ..................................................... H04Q 7/28
[52] U.S. Cl. ......................... 379/58; 370/95.1; 370/95.2; 395/148; 455/33.1
[58] Field of Search ...................... 340/825.08; 370/85.1, 370/85.13, 85.14, 94.1, 94.2, 94.3, 95.1, 95.2; 379/58; 375/205; 380/31, 48; 395/148; 455/33.1

[56] References Cited

U.S. PATENT DOCUMENTS

| | | | |
|---|---|---|---|
| 4,626,845 | 12/1986 | Ley | 340/825 |
| 4,833,701 | 5/1989 | Comroe et al. | 379/60 |
| 5,058,201 | 10/1991 | Ishii et al. | 455/33.1 |
| 5,210,753 | 5/1993 | Natarajan | 370/95.1 |
| 5,239,466 | 8/1993 | Morgan et al. | 395/148 |
| 5,287,384 | 2/1994 | Avery et al. | 375/1 |
| 5,371,780 | 12/1994 | Amitay | 379/58 |
| 5,461,627 | 10/1995 | Rypinski | 370/95.2 |

OTHER PUBLICATIONS

Polilli, "Motorola Envisions Connecting Wireless Technologied to LANs", InfroWorld, p. 10. Nov. 22, 1995.
Cox, "Personal Wireless Communications", IEEE Antennas and Propagation Society International Symposium. Jul. 1992.
Dagres, "Pulling the Right Strings", IEEE. Jun. 1992.

*Primary Examiner*—Curtis Kuntz
*Assistant Examiner*—William Cumming
*Attorney, Agent, or Firm*—Perman & Green

[57] ABSTRACT

A wide-area-network (WAN) system and the operation thereof involves a plurality of local-area network (LAN) systems with mobiles, base stations and TRS switching systems, and a systematical WAN system for the TRS switching system having a LAN controller for several LAN systems, thereby controlling wireless transmission signal level, providing communication service even when the mobile moves, and designating the range of communication service available for respective mobile.

9 Claims, 4 Drawing Sheets

WIDE-AREA-NETWORK TRUNKED RADIO SYSTEM WHICH CONTROLS THE SIGNAL LEVEL OF A SPECIFIC WIRELESS VOICE CHANNEL OF A LOCAL AREA NETWORK TRUNKED RADIO SYSTEM

BACKGROUND OF THE INVENTION

The present invention relates to a trunked radio system (TRS), and more particularly, to a local-area-network (LAN) TRS/wide-area-network (WAN) TRS and the operation thereof in which information on the overall mobiles is processed into a data base. Several LANS for controlling a plurality of mobiles and a WAN for connecting and collectively controlling the plurality of LANs are stratified so that respective mobiles are able to receive communication service anywhere in the WAN, and the grading of communication service and the control of transmission signal level are effectively performed.

FIG. 1 shows a configuration of a conventional LAN TRS, with FIG. 2 illustrating the relationship among the conventional LAN TRSs.

First, the conventional LN TRS is composed of a TRS switching system A10, a public switched telephone network (PSTN), wireless voice channels R1-Rm, a control channel CC, and mobiles 1-m. Wireless voice channels R1-Rm provide a path for transmission and reception of a voice signal and data to and from a mobile, and are allocated by control channel CC. Control channel CC transmits the voice signal and data of the mobiles to TRS switching system A10 by means of a wire or a microwave, and transmits the voice and data output from TRS switching system A10 to a corresponding mobile. Control channel CC allocates wireless voice channels R1-Rm to respective mobiles and transmits various data such as location information on the mobiles to TRS switching system A10. TRS switching system A10 controls control channel CC and wireless channels R1-Rm by using the various data of mobiles 1-m so as to enable to communication between the respective mobile and the PSTN.

FIG. 2 shows three nearby LAN TRSs A100, A200 and A300.

Communication among the conventional LAN TRS and a plurality of other LAN TRS will be described below.

Respective LAN systems A100, A200 and A300 control only mobiles registered in the LAN TRS systems and do not provide communication service to mobiles which have migrated from other LAN TRS systems, because respective mobiles registered in one LAN TRS system are able to receive communication service only within a limited area of communication service of that LAN system. In addition, the output of the wireless voice channels of the respective LAN TRS systems is uniformly maintained only for the mobiles concerned, without the effects of other LAN TRS systems being considered.

Accordingly, in a plurality of LAN TRSs A100, A200 and A300, voice signal/data communication passages only are connected between the respective LAN TRS, but there cannot be constructed a WAN TRS for the overall LAN TRSs A100, A200 and A300.

Since such a LAN TRS cannot control the output between the mobiles and wireless voice channels of several LAN TRSs, an interference produced at an overlapping portion of communication service areas of the respective LAN TRSs cannot be prevented, and there is the possibility that communication service may be frequently interrupted inside the limited area of communication service of the respective LAN TRSs. When a mobile registered on a LAN TRS system migrates into the communication service area of other LAN TRS on which the mobile is not registered, and requests communication service, the other LAN TRS doesn't provide communication service to the mobile. Further, if communication service surpasses a limit of capacity in a LAN TRS, an enormous cost is needed for the expansion of capacity.

SUMMARY OF THE INVENTION

Therefore, in order to solve such problems, there is provided a WAN TRS in which several LAN TRSs are connected to be controlled as one WAN TRS. A series of data on the overall mobiles of respective LAN TRSs and the overall data on the respective LAN TRSs are processed into a data base. The WAN TRS connecting one LAN TRS with several LAN TRSs is stratified so as to receive communication service wherever the mobiles are located in the communication service areas of the WAN TRS. The output of respective base stations is controlled to prevent interference so as to facilitate providing communication service even in a limited area of communication service of the respective LAN TRS, and a TRS switching system controller is duplicated with a spare wireless voice channel to cope with an emergency.

To accomplish the object of the present invention, there is provided a wide-area-network (WAN) trunked radio system (TRS) comprising: local-area-network (LAN) TRSs for providing mobiles located in a predetermined area with selective wireless communication service and wireless communication signal level in accordance therewith, and outputting relevant information on the wireless communication signal strength and wireless communication service to the mobiles via a first exclusive line; a LAN information memory for storing the information of the respective LAN TRSs which is supplied from the first exclusive line; and a LAN for storing the information supplied from the first exclusive line in the LAN information memory, and for analyzing the stored information, and instructing the LAN TRSs in controlling the signal level of a specific wireless voice channel and the wireless communication service to specific mobiles via the exclusive line.

Further, there is provided, in an operation of a WAN TRS, a method of controlling the signal level of a base station comprising the steps of: performing periodic or random checking for the wireless communication signal level of the overall base stations in a TRS, and converting the signal level into numerated information; and detecting and analyzing the interference among the overall base stations, and controlling the wireless communication signal level of a base station where the interference is severe so as to remove the interference.

Furthermore, in an operation of a WAN TRS, there is provided a method of providing a mobility and service grade to a mobile of a WAN system of a TRS switching system comprising the steps of: if a mobile moves into the communication service area of one LAN TRS of a WAN TRS and requests communication service, receiving the request and deciding whether the communication service can be offered; if the communication service is allowable, performing the communication service to the mobile via the base station and instructing to designate the permission range of the service; causing the base station to inform the mobile that the communication service is available and to which range the service is possible, and performing the communication service; and if the communication service is impossible in the first step, informing the base station that the communication service is impossible, and causing the base station to inform this fact to the mobile.

BRIEF DESCRIPTION OF THE DRAWINGS

The above object and advantages of the present invention will become apparent by describing the preferred embodiment of the present invention with reference to the attached drawings, in which.

DETAILED DESCRIPTION OF THE INVENTION

Hereinafter, a preferred embodiment of the present invention will be described in detail with reference to the attached drawings.

Figure 1:
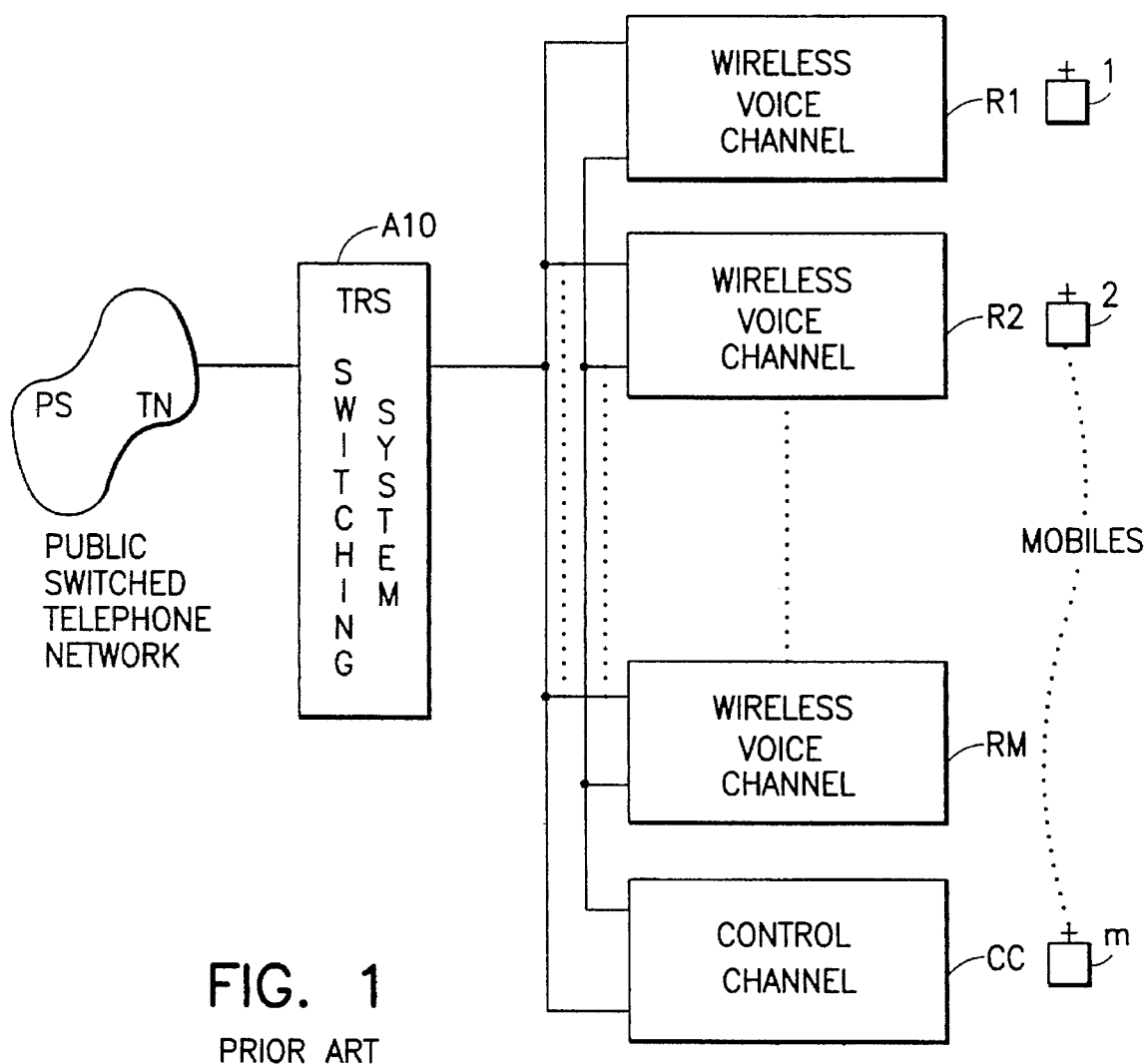
FIG. 1 illustrates a configuration of a conventional LAN TRS.
Figure 2:
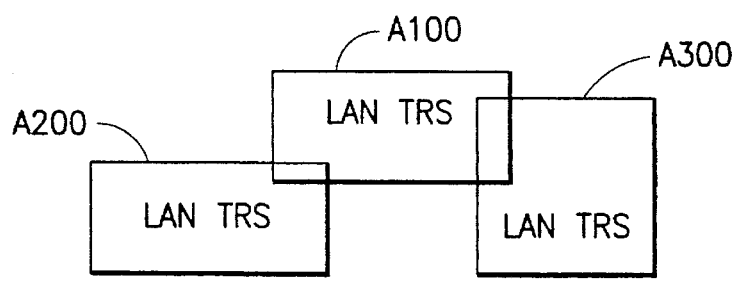
FIG. 2 illustrates the relationship between the conventional LAN TRSs.
Figure 3:
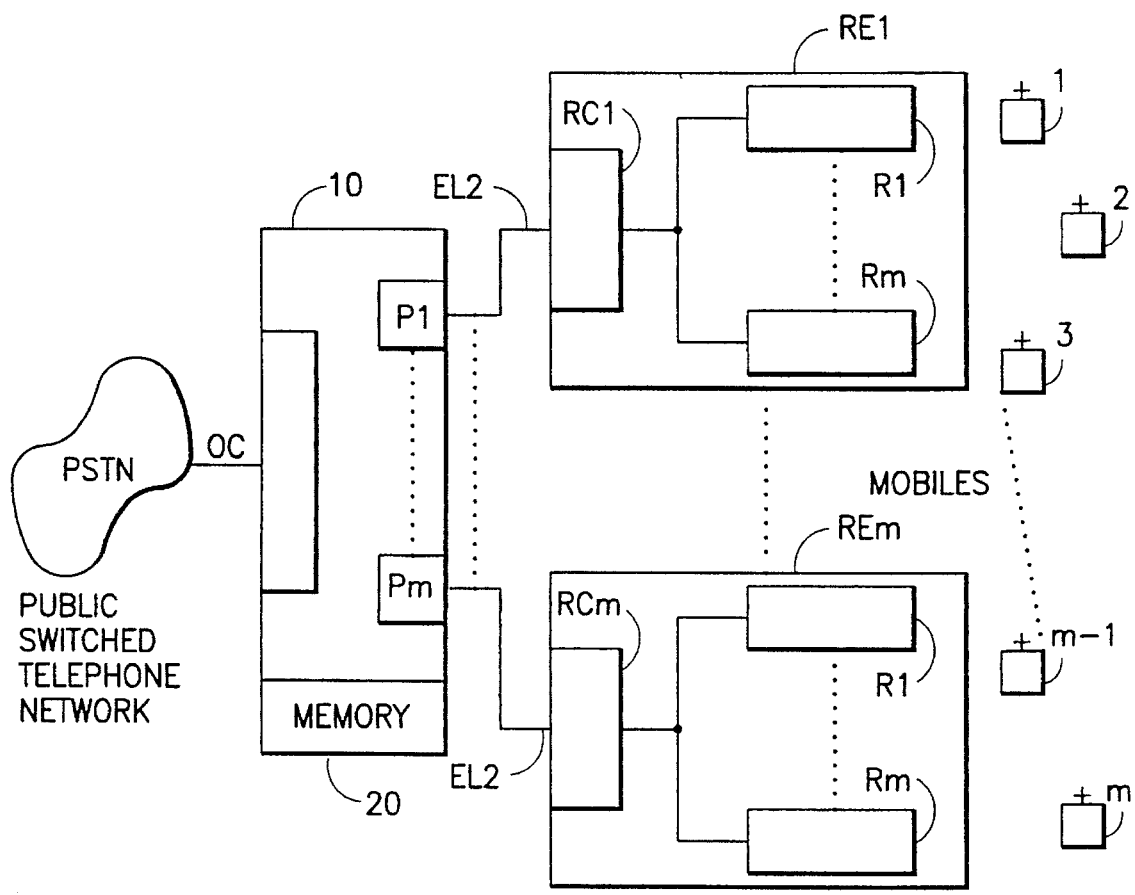
FIG. 3 illustrates a configuration of a LAN TRS of the present invention.

FIG. 3 shows a LAN TRS in accordance with the invention which consists of a PSTN, a TRS switching system 10, base stations RE1-REm, and mobiles 1-m.

Base stations RE1-REm comprise wireless voice channels R1-Rm for providing a communication path to a specific mobile terminal according to the control of wireless channel controllers RC1-RCm, transmitting the voice signal and data of the specific mobile to TRS switching system 10, and transmitting the voice signal and data from TRS switching system 10 to a corresponding mobile. The base stations further comprise wireless channel controllers RC1-RCm connected via and exclusive line EL2 to base station connectors P1-Pm of TRS switching system 10 and for controlling wireless voice channels R1-Rm under the control of TRS switching system 10 so as to designate to what mobile and through what wireless voice channel a communication path is supplied, and for providing information such as location, fare or service grade of a mobile allocated to the respective base stations R1-Rm to TRS switching system 10.

Figure 4:
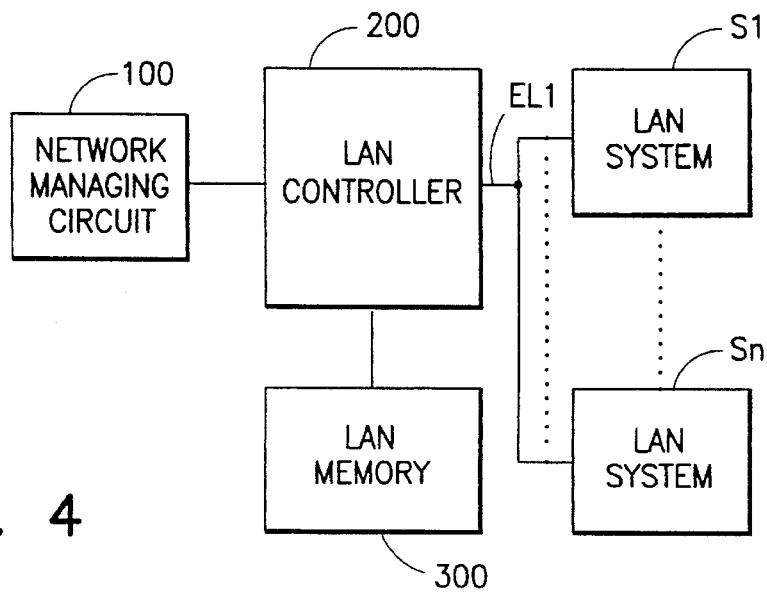
FIG. 4 illustrates a configuration of a WAN TRS of the present invention.

To collectively control respective base stations RE1-REm, TRS switching system 10 is made up of a line connector OC for connection with the PSTN, base station connectors P1-Pm for connection of base stations RE1-REm, and a base-station information memory 20 for storing information on the location or fare of mobiles provided from wireless channels RC1-RCm of respective base stations RE1-REm, and information on the service grade of mobiles 1-m permittable at respective base stations RE1-REm As shown in FIG. 4, a WAN TRS in which a plurality of LAN TRSs of FIG. 3 are coupled, comprises a network managing circuit 100, a LAN controller 200, a LAN memory 300, and LAN systems-S1-Sn of the TRS switching system.

Respective LAN TRSs S1-Sn are connected to LAN controller 200 via an exclusive line EL1 to TRS switching system 10. TRS switching system 10 supplies various information of base-station information memory 20 to LAN controller 200, and controls the providing of communication signal level or communication service information of respective base stations RE1-REm under the control of LAN controller 200.

LAN controller 200 stores to LAN memory 300 information on the location, service grade, communication fare of the overall mobiles offered by the TRS switching system of respective LAN systems S1-Sn, and information on the transmission signal level between the overall base stations and mobiles, and controls the TRS switching system of respective LAN TRSs S1-Sn, considering the information, so that selective communication service and service grade according to location shift are provided to the overall mobiles and the transmission signal level between the overall relay stations and mobiles is controlled.

Network managing circuit 100 retains a program for operating the whole WAN system so that the whole WAN TRS is controlled by the manipulation of the program by a user for network managing circuit 100.

Figure 5:
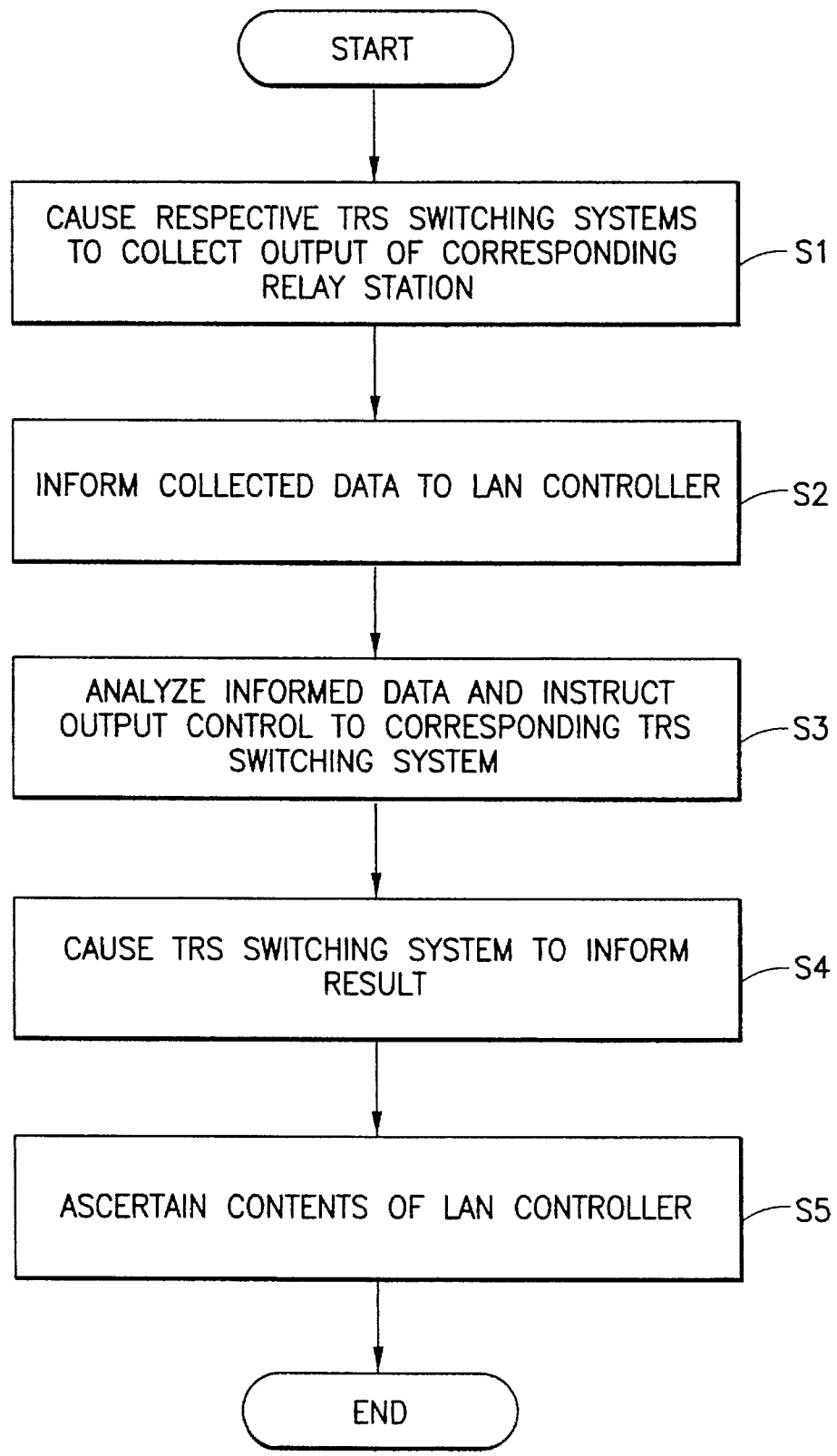
FIG. 5 is a flowchart of the process of controlling the signal level of a base station in the WAN TRS of the present invention and FIG. 6 is a flowchart of the process of providing communication service and the grading of service in accordance with a location shift of a mobile in the WAN TRS of the present invention.
Figure 6:
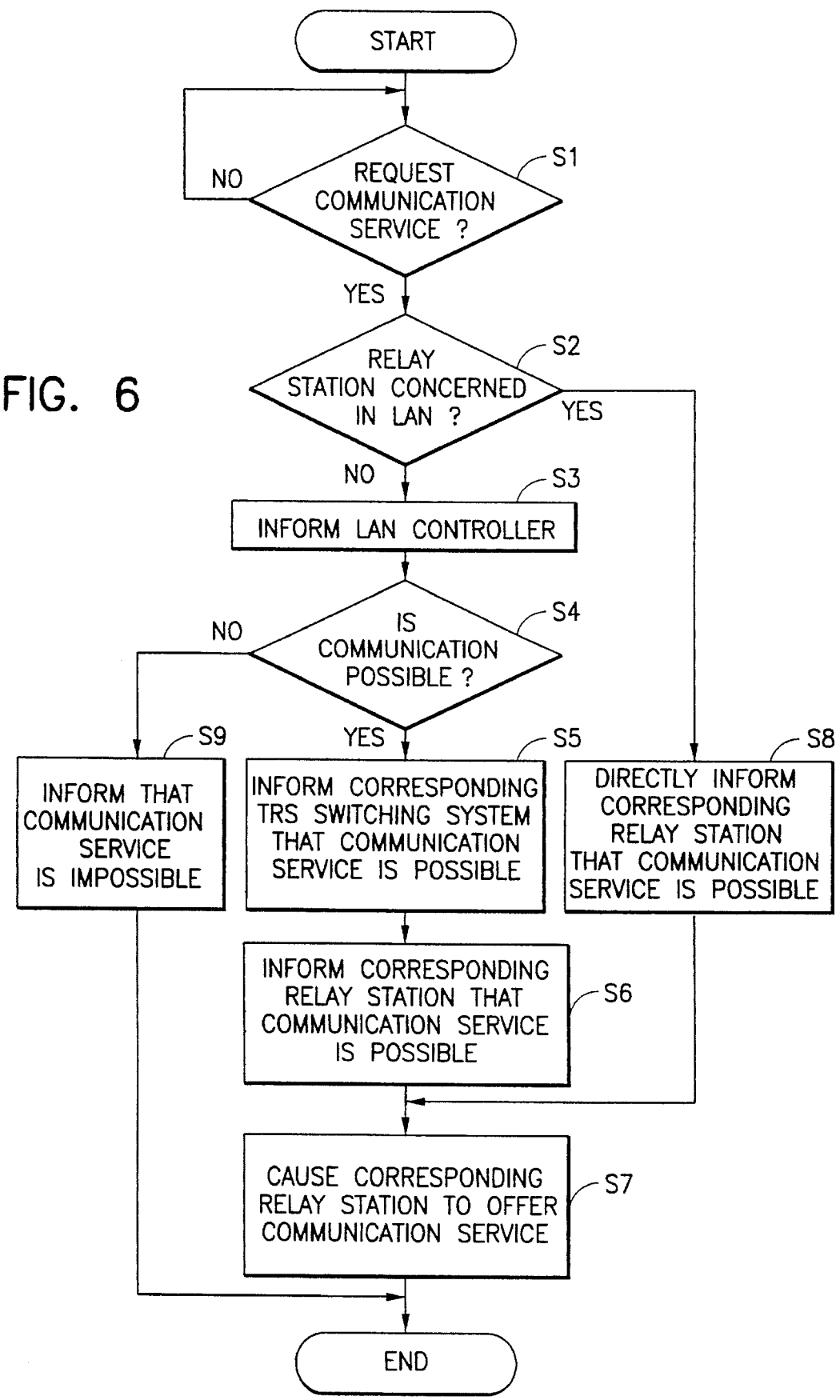

From now on, according to the present invention, a process of controlling the signal level of base station in the WAN TRS, providing communication service when the mobile moves, and offering the service grade will be explained with reference to FIGS. 5 and 6.

First of all, the process of controlling the signal level of the base station in the WAN TRS will be described with reference to FIGS. 3, 4 and 5. In step S1, respective base stations RE1-REm of the overall LAN systems S1-Sn connected to LAN controller 200 continually measure information on the signal level, signal-to-noise ratio, or calling success rate of mobiles belonging to the respective base stations RE1-REm. The measured values are stored in wireless voice channel controllers RC1-RCm and transmitted to TRS switching system 10.

In step S2, TRS switching system 10 analyzes the transmitted information and numerates interference occurring in respective base stations RE1-REm. The numerated data is stored in base station information memory 20 and analyzed so that, if the interference between respective base stations RE1-REm occurs over a predetermined value, the fact is immediately reported to LAN controller 200 via an exclusive line. Otherwise, the signal level information of respective base stations RE1-REm is reported to LAN controller 200.

In step S3, LAN controller 200 compares and analyzes the signal level information periodically or aperiodically supplied from TRS switching system 10 of respective LAN systems S1-Sn, and stores the result in LAN memory 300. On the basis of the analyzed result, a base station in which the interference is severe sends a signal level control command for controlling the signal level to the TRS switching system of a corresponding LAN system.

In step S4, TRS switching system 10 which has received the signal level control command instructs the signal level control to a corresponding base station, and the corresponding base station controls the signal level with the mobile concerned. Thereafter, in step S5, the information on the signal level controlled by the base station is transmitted to a corresponding TRS switching system. The TRS switching system numerates the transmitted information and applies it to LAN controller 200. LAN controller 200 ascertains whether the signal level of the base station is controlled on the basis of the applied data or not.

Sequentially, the process of providing communication service when the mobile moves, and offering the service grade will be explained with reference to FIGS. 3, 4 and 6.

In step S1, when mobile 1 shifts from the communication service area of LAN TRS S1 to which it belongs and requests a location registration to the base station REm of LAN TRS Sn, in other words, requests a temporary registration number to receive communication service by using base station REm, base station REm requests the temporary registration number of the mobile together with the base station serial number and base station ID number to the TRS switching system.

In step S2, TRS switching system 10 decides whether the serial number and ID number of base station REm and the old registration number of mobile 1 indicates the mobile shifted from the base station concerned, by analyzing the data of the base-station memory. In step S3 if it is decided that the mobile is not shifted from the base station concerned, the TRS switching system in LAN TRS Sn informs LAN controller 200 of the temporary registration request information of base station REm via the exclusive line. Here, the temporary registration request information includes the serial number and ID number of the base station and the ID number of the TRS switching system. In step S4, LAN controller 200 compares and analyzes the temporary registration request information with the data stored in LAN memory 300, and decides whether mobile 1 requesting the temporary registration number to base station REm can receive communication service or not.

In step S5, if it is decided that the mobile can receive communication service, LAN controller 200 designates a usable service grade to mobile 1 together with the temporary registration number, so as to discriminate the service grade from the communication service grade of a mobile previously controlled by the base station REm. The designated information is stored in LAN memory 300 and simultaneously transmitted to the switching system of LAN TRS Sn.

In step S6, the TRS switching system receives and stores a new permission number and communication service grade in the base-station information memory. Then, the TRS switching system informs base station RE1 which controls prior-to-location-shift mobile terminal 1, of the shift of mobile 1, and transmits the temporary registration number and service grade of mobile 1 to base station REm. This transmission is informed to LAN controller 200. In step S7, base station REm informs mobile 1 of the temporary registration number and service grade and performs communication service. If in step S2, it is decided that mobile 1 has moved from the base station of LAN TRS Sn, the TRS switching system of LAN TRS Sn itself designates the temporary registration number and service grade and stores them in the base-station information memory. This fact is informed to base station REm and to LAN controller 200. In step S8, base station REm informs mobile 1 of the temporary registration number and service grade, and starts communication service. In step S9, if in step S4, communication service cannot be provided to mobile 1, this fact is informed to the TRS switching system. Then, the TRS switching system informs base station REm of this fact, and base station REm informs mobile 1 that communication service is impossible.

As described above, the present invention hierarchically constructs a WAN TRS uniting several LAN TRSs with mobiles, base stations, TRS switching systems, LAN TRSs and LAN controllers in their sequence. The WAN TRS systematically processes various data on the overall mobiles, base stations, and TRS switching systems in data base so as to prevent the interference created due to the respective base stations, further the wireless signal level of the respective LAN TRSs, and offer communication service wherever the respective mobiles are located in the communication service available area of the WAN TRS, thereby enabling the operation of the communication network to be systematical, efficient and effective.

While the invention has been particularly shown and described with reference to preferred embodiments thereof, it will be understood by those skilled in the art that any modification and other changes in form and details can be made therein without departing from the spirit and scope of the invention.

What is claimed is:

1. A wide-area-network (WAN) trunked radio system (TRS) comprising:

a plurality of local-area-network (LAN) TRSs for providing mobiles located in a predetermined area with selective wireless communication service and wireless communication signal level in accordance therewith, and outputting relevant information, on the wireless communication signal level and wireless communication service to said mobiles via a first exclusive line;

a LAN TRS information memory for storing the relevant information of said respective LAN TRSs which is output on said first exclusive line; and a LAN TRS controller means, connected to said first exclusive line and said LAN TRS information memory, for storing the information supplied from said first exclusive line in said LAN TRS information memory, and for analyzing the stored information and providing instructions to said LAN TRSs for controlling the signal level of a specific wireless voice channel and the offering of wireless communication service to a specific mobile via said first exclusive line.

2. A WAN TRS as claimed in claim 1, wherein said LAN TRSs each comprise:

a plurality of base stations to each of which a predetermined number of said mobiles are allocated, said base stations providing a selective wireless voice channel and a predetermined level of wireless voice signal level to said allocated mobiles and outputting information on the supply of the wireless voice channel and the wireless communication signal level via a second exclusive line; and further comprising:

a TRS switching system, connected to said first and second exclusive lines, for controlling said base stations according to the result of analyzing the information from said base stations and the instruction of said LAN TRS controller means supplied via said first exclusive line, and for providing selective wireless communication service, and varying the signal level of the wireless voice channel over said second exclusive lines.

3. A WAN TRS as claimed in claim 2, wherein said base stations comprise:

wireless voice channels for supplying a predetermined level of wireless voice channel to said allocated mobiles; and wireless channel controllers for outputting the signal level of wireless voice channel and information on the state of the wireless voice channel and on the registration number and communication service grade of said allocated mobiles, and causing said wireless voice channels to provide a predetermined signal level of wireless voice channel to a specific mobile under the control of said TRS switching system.

4. A WAN TRS as claimed in claim 2, wherein said TRS switching system comprises:

a line connector OC for connection with a PSTN;

base station connectors for connection to said respective wireless channel controllers of said base stations via said second exclusive lines; and a base-station information memory for storing the information supplied from said base stations via said second exclusive lines.

5. A WAN TRS as claimed in claim 2, further comprising a network managing circuit, connected with said LAN TRS controller means, having a program of operating said LAN TRS and performing the control operation of said LAN TRS controller means according to said program.

6. A system for providing wireless communication to a mobile located in a predetermined area, comprising:

a plurality of local-area-network trunked radio systems (LAN TRSs), each having a plurality of base stations with a plurality of wireless voice channels, for providing said mobile with selective wireless communication service, and a wireless communication signal level in accordance with said service, and for outputting relevant information on the provision of said wireless communication signal level and wireless communication service to said mobile; and a wide area network (WAN) means for receiving said relevant information output comprising:

memory means for storing the relevant information; and controller means, connected to said memory means and said LAN TRSs, for analyzing the stored relevant information and providing instructions to said LAN TRSs for controlling the signal level of a specific wireless voice channel and the offering of wireless communication service to said mobile.

7. A system as claimed in claim 6, further comprising:

a TRS switching means, connected to said controller means and said LAN TRSs, for controlling said base stations in said LAN TRSs in accordance with said instructions of said controller means and providing selective wireless communication service, and varying the signal level of the wireless voice channel, to said mobile.

8. A system as claimed in claim 6, further comprising wireless channel control means, connected to each wireless voice channel, for outputting the signal level of the respective voice channel and information on the state of said channel, a registration number, and a communication service grade.

9. A system as claimed in claim 6, further comprising:

network managing circuit means, connected to said controller means and having a program for operating said LAN TRSs, for controlling the operation of said controller means according to said program.

* * * * *